Oct. 12, 1948.    R. M. VINYARD    2,451,419
DUPLEX MICROMETER GAUGE
Filed Sept. 2, 1947

Inventor
Roy M. Vinyard
By Dodge
Attorneys

Patented Oct. 12, 1948

2,451,419

UNITED STATES PATENT OFFICE 2,451,419

DUPLEX MICROMETER GAUGE

Roy M. Vinyard, Portland, Oreg.

Application September 2, 1947, Serial No. 771,648

3 Claims. (Cl. 33—181)

1

This invention relates to micrometer gages and particularly to a duplex gage which permits the user to measure accurately the interval between two parts which normally are inaccessible, but each of which is definitely positioned relatively to respective parts of a two-part separable housing.

To simplify description, and without implying limitation to that particular field, the invention will be described as embodied in a device to measure the clearance between the stem of a pop valve (when the valve is closed) and the stop which limits the opening movement of the valve. This dimension happens to be important because it controls the operative characteristics of the valve in question. Hence it must be determined accurately as a basis for acceptance or rejection of the valve.

Such a valve has a housing in which the pop valve is mounted and guided, and in which the regulatory mechanism is enclosed. Threaded on the housing and accurately positioned thereon by a stop shoulder is a cap which carries the stop used to limit the opening movement of the pop valve. The invention provides a duplex gage set made up of two functionally related micrometer gages, each of which has a body and an ordinary micrometer screw. The bodies have threads by which they may be screwed together until stops provided on the bodies limit the threaded motion. The threads are dimensionally identical with the threads which connect the housing and the cap of the valve and the stops which limit the threaded engagement of the two gage bodies are adapted to perform a similar function when the two gage bodies are separated from each other and connected, one with the cap, and the other with the valve housing. Moreover the threads on the gage bodies are substantially co-axial with the micrometer screws so that the micrometer screws are alined and will be properly centered in the valve housing and in the valve cap.

The graduations on the two gages are coordinated with the stops so that they are dimensionally related. The relationship is such that the algebraic sum of the readings of the two gages is equal to the clearance.

A preferred embodiment of the invention will now be described by reference to the following drawings, in which Figure 1 is an axial sectional view of the two gages connected together, with the lower gage set at zero.

2

Figure 2:
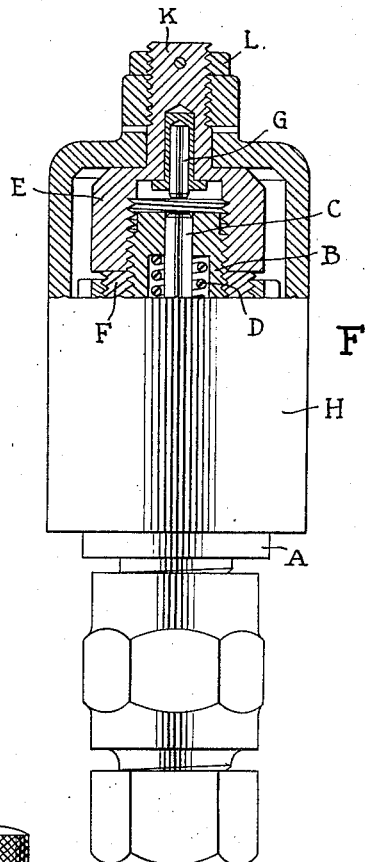
Figure 2 is a view partly in elevation and partly in section showing a typical pop valve.

Refer first to Figure 2. A represents the body of a pop valve which has a threaded stem B with a guideway at its top for the stem C of the pop valve. The pop valve itself is not visible in the drawing but it is biased downward (in a closing direction) by coil compression spring D. A cap E is threaded on the upper end of the stem B and seats against a stop F. The stop F is an adjustable nut whose adjustment determines the clearance between the stem C and the stop pin G carried by the cap E. During the measurement operation herein described, the stop F is fixed. The skirt member H is merely a muffler and dust-guard threaded on the stem K, formed integrally with the cap E. It is retained thereon by a nut L.

To prepare the valve for measurement of the interval between the upper end of stem C and the stop pin G, the nut L and the muffler H are removed. Thereupon the cap E is removed.

Figure 1:
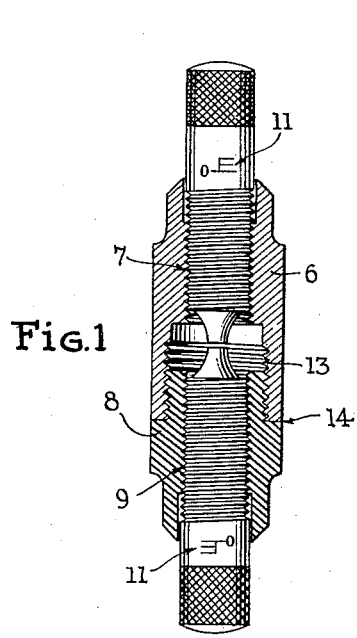
Figure 4:
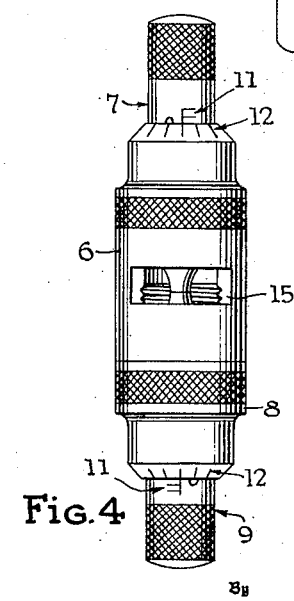
Figure 4 is an elevation showing the two gages connected together and each set to zero.

Refer now to Figures 1 and 4. The micrometer gage used on the valve housing comprises a body 6 and a micrometer screw 7 threaded therein. The micrometer gage for the valve cap comprises a body 8 and a micrometer screw 9 threaded therein. Each of the micrometer screws 7 and 9 carries a series of lineal graduations 11 which correspond to the pitch of its threads. Each of the bodies 6 and 8 has a circumferential series of graduations 12, each of which represents 0.001 inch.

One end of the body 6 is counterbored and internally threaded at 13. The other body 8, has a projecting sleeve which is externally threaded so as to engage the threads 13. The threads 13 are dimensionally identical with the threads on the stem B and consequently with the threads in the cap E. Threaded engagement of the bodies 6 and 8 is limited by shoulders which engage at 14.

Figure 3:
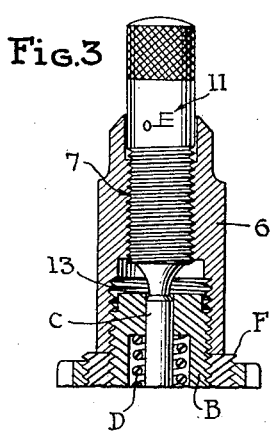
Figure 3 is an axial sectional view showing one of the gages applied to the valve body, and set to take a reading.
Figure 5:
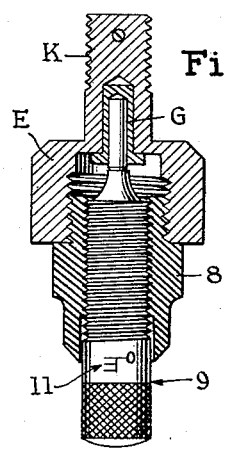
Figure 5 is an axial sectional view showing the other gage applied to the valve cap, and set to take a reading.

For use in gaging, body 6 is screwed into stem B, as shown in Figure 3 and body 8 is screwed into cap E, as shown in Figure 5.

When the bodies 6 and 8 are screwed firmly together to the limit defined by the shoulders 14 and both micrometer screws are set to read zero, as indicated in Figure 4, the ends of the micrometer screws 7 and 9 should be in gaging contact, as indicated in Figure 4. This important relationship is attained by proper location of the graduations.

It is also desirable, but not strictly necessary, that the plane of this engagement be so located relatively to shoulders 14 as to correspond geometrically to some plane normal to the common axis of the screws 7 and 9 and lying between the plane end of stop G and the plane end of stem C.

If this relationship is established, each screw 7 and 9 will give a positive reading when it gages the corresponding component of the valve; i. e. each screw must be turned right handed from zero to its gaging position. Since each reading is plus (+), the readings are added to determine the total clearance.

However, if the plane of engagement is outside the above specified limits, clearance can still be read. In such case one of the screws (say 7) must be turned right hand from zero to its gaging position, giving a plus (+) reading. The other screw (say 9) must be turned left hand from zero to reach its gaging position, giving a minus (−) reading. In such case the readings must be subtracted, one from the other to determine clearance.

In other words, clearance equals the algebraic sum of the two readings.

The manipulation to determined clearance is simple. Body 6 is screwed onto threaded stem B until it seats at F. Screw 7 is adjusted to engage stem C and graduations 11 and 12 are read. See Figure 3.

Body 8 is screwed into cap E until shoulder 14 seats. Screw 9 is adjusted to engage stop G. The graduations are read. See Figure 5.

The algebraic sum of the two readings so taken is the clearance.

It is necessary to check periodically to confirm the accuracy of the gages. The mode of doing so is illustrated in Figure 4. The bodies 6 and 8 are screwed together until they seat at 14. Then both screws 7 and 9 are set to zero. If their ends are then in gaging contact, the gages are correct.

An aperture 15 is desirably formed in body 6 to permit inspection of the gaging ends of the two screws in the operation just described.

An incidental advantage of the described construction is the fact that when the two gage bodies are screwed together all reference and gaging surfaces are protected.

If the gages do not check as above described with reference to Figure 4, they can still be used to gage clearance provided the graduations of either screw 7 or 9 be accurate. The procedure is as follows.

Assume 7 is the accurate screw. In such case screw body 8 to cap E and adjust screw 9 to contact with stop G. Then remove body 8 while preserving the adjustment of screw 9. While still preserving this adjustment, screw bodies 6 and 8 together. Then adjust screw 7 to contact with screw 9 and read its setting. Separate the bodies 6 and 8. Screw body 6 onto stem B and adjust screw 7 into contact with stem C. Read this second adjustment. The difference between the two readings so taken is the clearance.

In the interest of simplicity the micrometer screws are shown in their elemental form without the means commonly provided for adjusting friction and without any clamp. These details are common practice in the micrometer art and their addition to the simple mechanism illustrated is not necessary and could involve nothing more than mechanical skill. Their inclusion is possible in any case where the extra expense is justified.

While one embodiment of the invention has been described in detail, variations are possible, and some have been specifically mentioned. No necessary limitation to the illustrated embodiment of the invention is implied. The scope of the invention will be apparent from the following claims.

What is claimed is:

1. A gage set for measuring alined internal parts of a device having an enclosing housing and cap threaded on the housing with stop means limiting their threaded engagement, said set comprising two micrometer gages, each having a body and a micrometer screw, said bodies having threads by which they may be screwed together and stops for limiting their threaded engagement, said threads being dimensionally the same as the threads on the housing and cap and coaxial with the micrometer screws, and said stops being adapted to engage the stop means of the housing and cap to define gaging positions when the bodies are separated from each other and screwed to the housing and cap respectively.

2. The combination defined in claim 1, in which one of the gage bodies has an aperture in which the gaging ends of the micrometer screws are exposed when the bodies are assembled.

3. The combination defined in claim 1, in which the micrometer graduations are such that when the bodies are screwed together until their stops engage, and both micrometer screws are set to read zero the ends of the micrometer screws are in gaging contact.

ROY M. VINYARD.

No references cited.